Patented Nov. 8, 1949

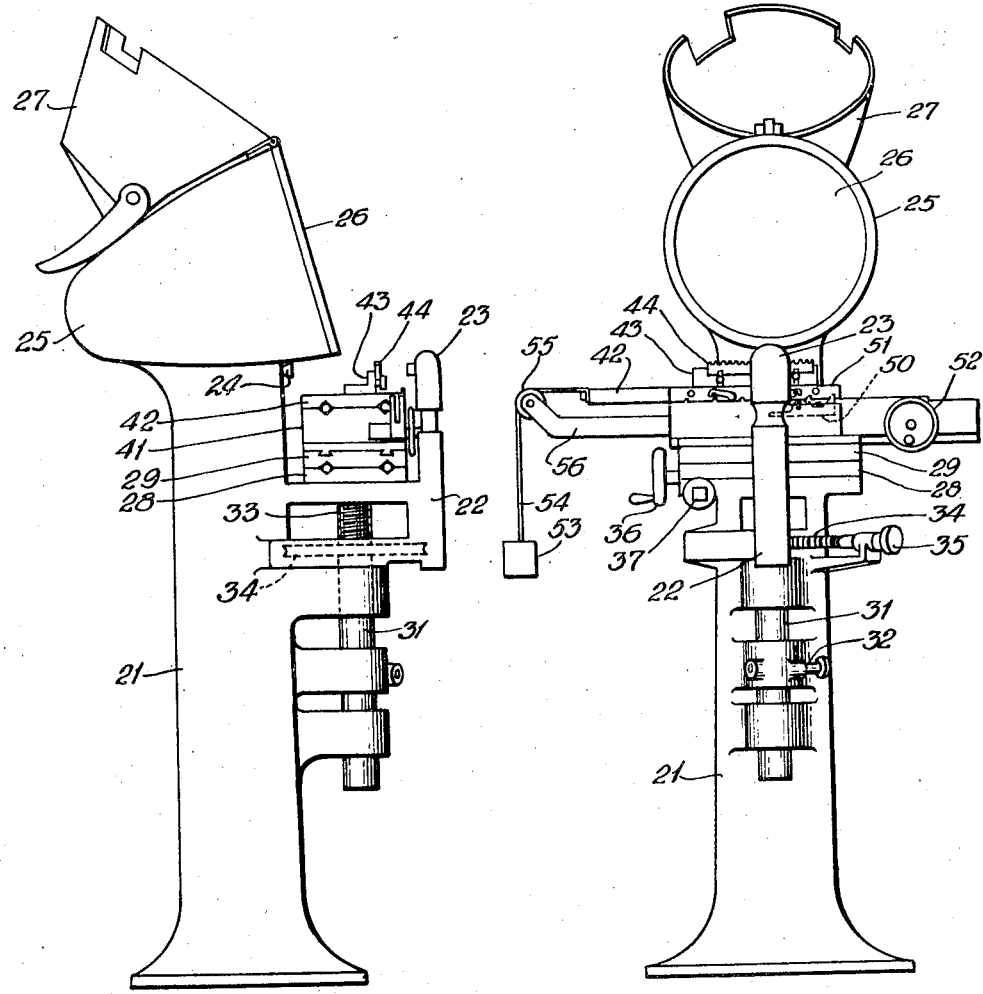

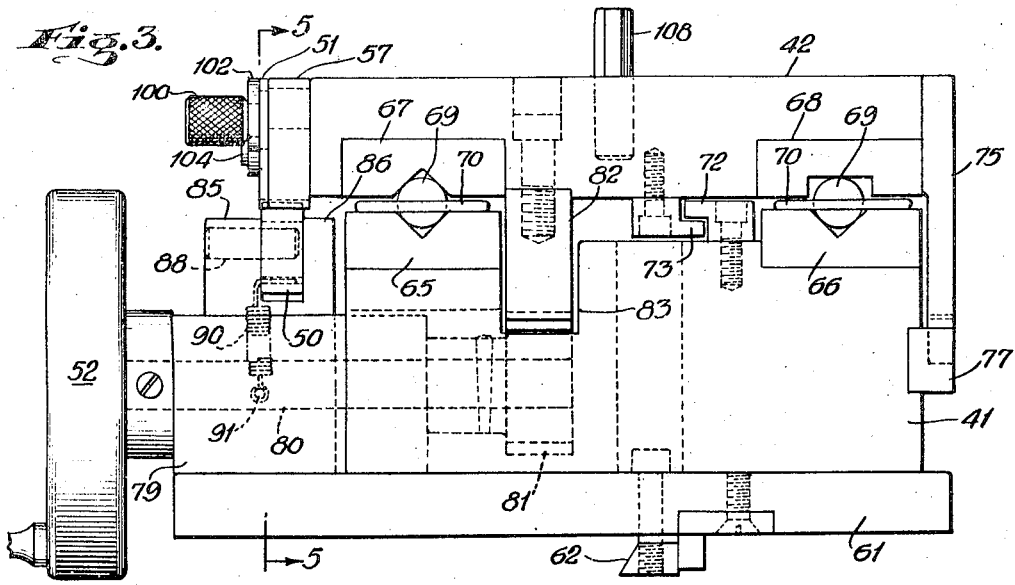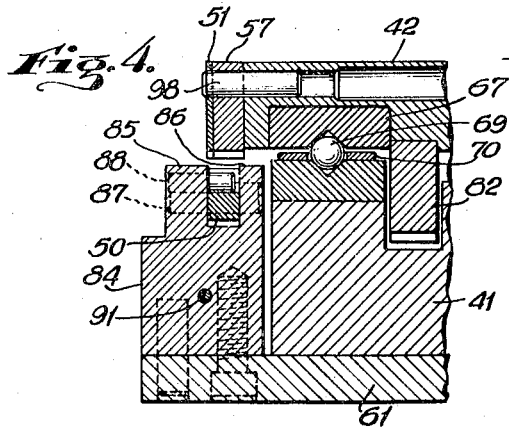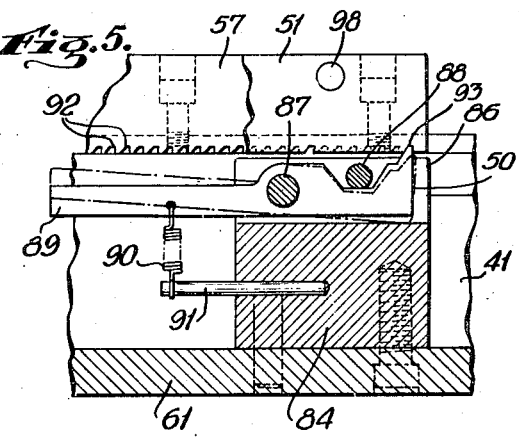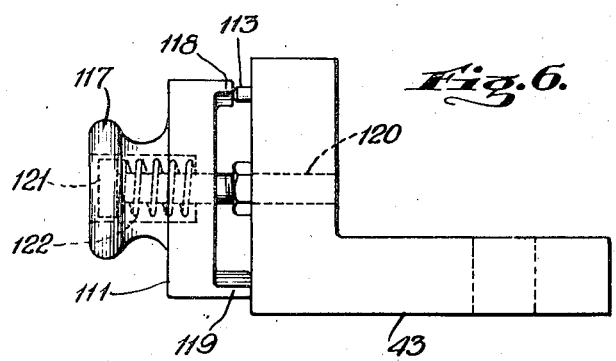

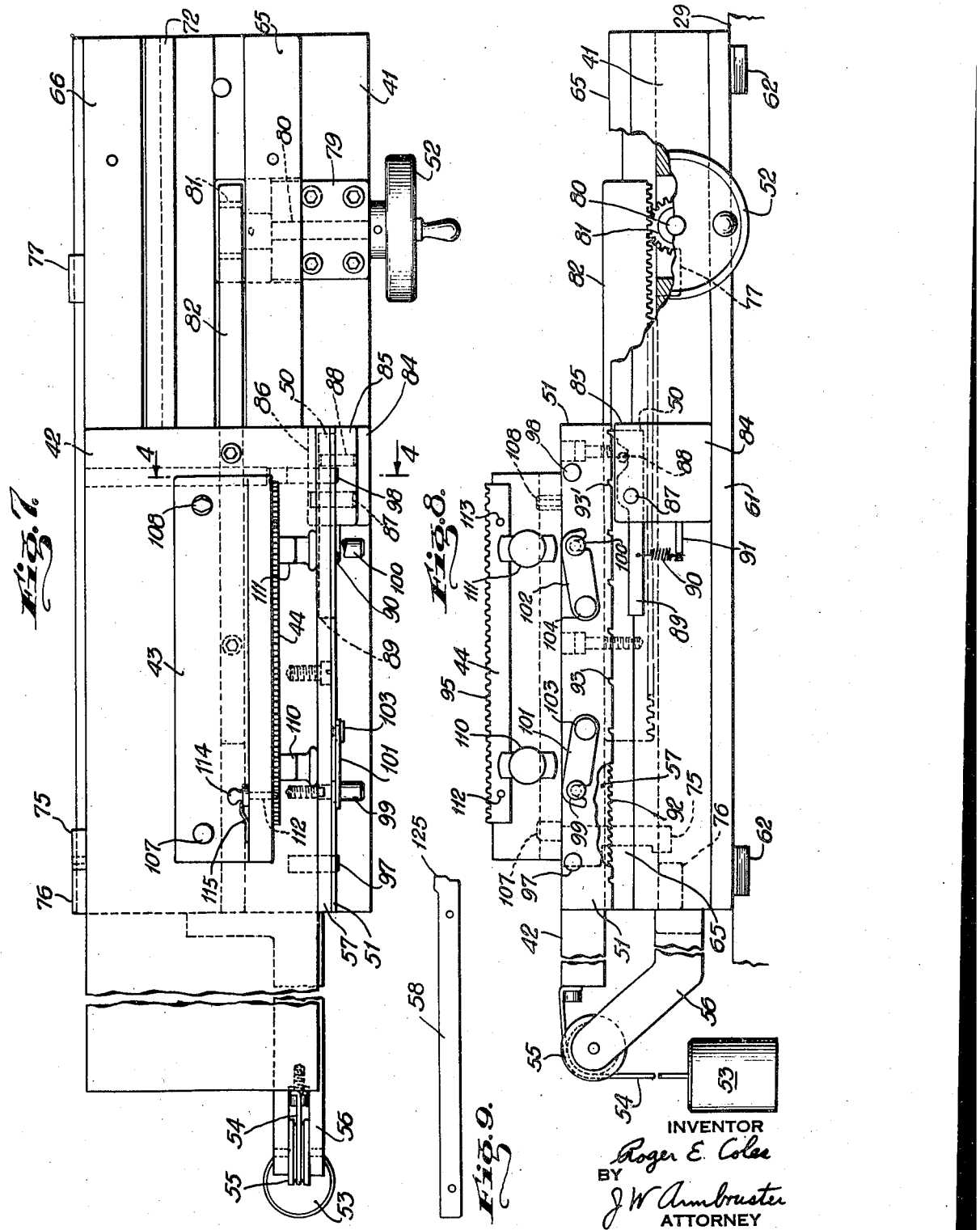

2,487,314

UNITED STATES PATENT OFFICE 2,487,314

INDEXING DEVICE FOR OPTICAL PROJECTION COMPARATORS

Roger E. Coles, Union, N. Y., assignor to International Business Machines Corporation, New York, N. Y., a corporation of New York Application November 27, 1946, Serial No. 712,581

4 Claims. (Cl. 88—24)

The invention relates in general to improvements in optical comparators and more particularly to an improved form of work holding table or stage for a comparator.

The advantages of optical comparators over other gaging means is that they enable minute examinations and accurate measurements to be made of an object, such as a manufactured part, by projecting an enlarged image of the part upon a screen which bears standard outlines or scale marks for defining acceptable limits.

An object of the invention is to provide means for facilitating the examination of objects having a plurality of critical points or areas to be examined. For example, in examining a long rack it is desirable to check the proportions of the teeth at intervals along the entire length. To carry out such multiple examinations rapidly, the devices include an auxiliary table, stage or object holder slide which is freely mounted with respect to a primary table fastened to the ordinary adjustable work table. Between the two extra tables or stages is a ratchet rack and pawl arrangement whereby accurate predetermined steps of movement may be made to move the auxiliary table and object thereon to one after the other of the critical areas and have the picture or silhouette thereof thrown on the comparator screen.

Heretofore, when a part had a number of surfaces to be compared, and such surfaces could not be thrown on the optical comparator screen at the same time, it was necessary to test the surfaces one at a time. That required running through the whole lot of parts on a test of one surface, then changing the position of the support to run the same lot through a test of another surface. It was particularly slow in the case of testing a long rack when, for example, it was necessary to check every seventh tooth and required repeated handling of the same rack eight or nine times to replace it on the support.

According to the present invention, there is provided a novel form of supporting means upon which a part to be tested can be securely mounted and then shifted to a number of accurately determined positions to examine separately different surfaces of the part. Thus, each part is handled only once, and time is saved in testing it in one series of comparing operations.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a side elevation view showing the complete optical comparator and assembled thereon the devices of the present invention.

Fig. 2 is a front elevation view of the complete machine shown in Fig. 1.

Fig. 3 is an end elevation view of the two supporting tables of the present invention.

Fig. 4 is a sectional elevation view taken on line 4—4 in Fig. 7 and showing the arrangement of parts for coordinating a stop location determining pawl in cooperation with a position determining ratchet rack.

Fig. 5 is an elevation view partly in section taken along the line 5—5 of Fig. 3 and showing the locating pawl cooperating with the positioning rack and the rack shield or mask.

Fig. 6 is an end view of the angular bracket for holding the work piece or object to be examined.

Fig. 7 is a plan view showing the positioning devices including the double table and angular bracket for holding the object to be examined by the optical comparator.

Fig. 8 is a side elevation view of the parts shown in Fig. 7.

Fig. 9 is a detail view showing the gage for determining the initial position of the main table and the auxiliary tables thereon as set by the comparator adjustment controls.

Referring to Figs. 1 and 2, a general description may be given of the kind of optical comparator to which the invention is applied for purposes of illustration. The machine shown is a standard "Jones & Lamson" pedestal style optical comparator. The main support frame 21 is formed with an extension 22 carrying a lamp housing 23 aligned with a projection lens 24 fastened under a hood 25 which contains a mirror for throwing images on a glass screen 26 which is shielded from direct light by the visor 27. It is well known that the apparatus is used to project rays of light from the housing 23, some of said rays being intercepted by an object or work piece 44 to be tested which is inserted between the housing 23 and the projection lens 24. An enlarged silhouette or image of the tested area is thrown on the glass screen 26, where it may be compared with charts having shapes and gage marks in double image or showing the allowable limits within which the object area examined is found acceptable.

The ordinary comparator construction comprises a fixed base or table 28 and a longitudinally and laterally adjustable table 29 mounted thereon.

The base 28 is fixed with respect to lateral and longitudinal movement but is adjustable vertically while the upper portion 29 is adjustable in the two horizontal directions, so that the top surface of the table 29 is movable in all three directions to bring objects thereon in desired positions relative to the testing rays of light.

The table is supported for vertical movement on a column 31 guided in vertical bearings extending from the main frame 21. The upper portion 33 of column 31 is threaded and has in cooperation therewith a large flat adjusting nut 34, the outer edge of which is toothed as a worm wheel for cooperation with an adjusting worm extending from an adjusting knob 35 (Fig. 2) which is manipulated to raise and lower the work holding table.

In order that it may be moved in both horizontal directions, the upper portion 29 of the work table has associated therewith a pair of adjusting screws terminating in operating handle 36 and adjustment nut 37. Hand wheel 36 is rotated to cause longitudinal movement from left to right for adjusting the table across the line of light rays. The adjustable nut 37 has connections cooperating with the table to move the work along the rays of light to adjust the object into focus.

The foregoing section of the description deals mainly with the ordinary construction and controls associated with an optical comparator. The portion of the specification which follows relates to the improvements of the present invention.

With reference to Figs. 1 and 2, the invention may be explained in general terms by pointing out the novel elements shown in outline in association with the standard comparator construction. There it is seen that a secondary table 41 is assembled on the ordinary work table 29 which, as already noted, is adjustable in all directions for positioning an object to an initial comparing position. Superimposed on this secondary table 41 is a third table 42 carrying an angular bracket 43 to which is secured a work piece 44; in this instance a rack to be tested to determine the proportions of the rack teeth formed thereon. The secondary table 41 is secured to the main movable table 29 and receives the initial adjustment by means of the three ordinary comparator adjusting means already described. However, the other movable table 42 resting upon table 41 is adjusted relative thereto by additional location determining devices for bringing a plurality of rack positions successively under observation of the light directed through the lens system of the comparator.

In comparing the critical areas of an object, such as the rack teeth of a rack with a standard chart placed on the glass screen, it is found unnecessary to compare each rack tooth with the standard shape. It is found possible to skip across the rack and examined, say, every seventh tooth and, if the teeth at these intervals are found shaped correctly, it may be safely assumed that the rack is acceptable. Such skipping is optional, however, and if desired each tooth shape or critical area can be checked.

Devices are provided between the two tables 41 and 42 so that table 42 may be shifted rapidly from one position to another without resorting to the slow ordinary controls of the comparator. The novel shifting controls include a pawl 50 which is pivotally mounted on the table 41, said pawl cooperating with a master ratchet rack 57 fastened to the side of table 42. The master rack 57 is proportioned with ratchet teeth at intervals coinciding with the intervals of the gear teeth on the object 44, so that when the two tables are shifted with respect to each other to those intervals determined by the cooperation between pawl 50 and master rack 57, the gear teeth at corresponding intervals on the object will be brought into focus and in this way the operator can examine the entire length of each rack in one continuous series of operations.

Heretofore, the procedure was to adjust the comparator table for one setting to compare one certain tooth of all rack pieces to be tested. Then, after all the racks are compared with relation to that one tooth position, the comparator was adjusted to bring another rack tooth position in focus and then all the rack pieces were again inserted successively in the machine. This involved the repeated handling of the same pieces for every tooth position to be tested. Now, by means of the devices shown, each rack is handled only once, and all successive testing positions are analyzed at the same time by rapid movement of a hand wheel 52, which controls movement of the table 42 toward the right to bring one after the other of the ratchet teeth of master rack 57 into cooperation with the pawl 50.

Table 42 is constantly urged toward the left by means of a weight 53 which is suspended by a wire 54 passing over a pulley 55 and attached to the end of table 42. A bracket 56 extends from table 41 and carries the pulley 55 around which wire 54 is guided.

Although the devices are described hereinbefore in general terms, it is believed well to note the details of construction shown in Figs. 3 to 9 inclusive.

Referring to Figs. 3, 4 and 5, it is noted that the secondary or intermediate table 41 is composed of a number of parts joined together for supporting the controlling elements of the top table 42. The main body of the intermediate table is supported on a rectangular base 61 to which is secured a pair of feet 62 of dove-tail shape to engage with the corresponding grooves in the regular adjustable table 29 (Fig. 1) of the comparator. In Fig. 8 it is seen that these feet 62 are widely spaced and assembled near the ends of the base 61 to provide a firm source of location, whereby the table 42 is rigidly attached to table 29 to move along therewith in adjustment to the initial testing positions.

Attached to the top of table 41 (Fig. 3) is a pair of rectangular ball bearing race ways 65 and 66. These race ways coincide in position with similar superimposed ways 67 and 68 fastened to the under side of the movable table 42. A number of ball bearings 69 are held within the confines of the race way by means of flat retainer strips 70 extending along the length of the table. These ball bearing supports provide a freely moving connection between the two tables of the invention and make possible the rapid relocation of the object to be tested in a plurality of positions. It will be noted that the race way in part 68 is not of the conventional angular formation but is of a square-cornered shape to place dependence for the relative positioning of the table 42 with respect to table 41 upon the position of the V-shaped grooves in the race ways 65 and 67.

A pair of shouldered retaining strips or bars 72 and 73 are provided to hold the top table 42 down on the lower table 41. Bar 72 is secured to the top of the bottom table 41 and the other bar 73 is fastened to the under side of the upper table 42. The shoulder portions of the two bars are brought into a coinciding position wherein they normally have a small amount of clearance. However, upon any tendency of the table to jump off the race ways, the shouldered bars act as retainers to hold it down in position.

Other retaining means are provided to act as stops to limit the longitudinal movement of the upper table with respect to the lower table. Secured to the rear side of the upper table 42 is a downwardly extending arm 75 which is blocked from over extended movement by a pair of stop blocks 76 and 77 (Fig. 7) fastened to the rear wall of table 41.

Erected near the center of the front wall of table 41 is a bearing block 84 (Figs. 4, 5 and 8) secured to the base plate 61. This bearing block 84 acts as a support for the locating pawl 50 and another bearing block 79 (Fig. 7) acts as a support for the operating mechanism including the hand wheel 52. Secured to wheel 52 is one end of a short shaft 80 which passes through the bearing block 79 and has at the other shaft end a pinion 81 secured thereto. Pinion 81 meshes with a long rack 82 fastened to the under side of the top table 42. The lower table 41 is cut out at portion 83 (Fig. 3) to allow free movement of rack 82 longitudinally as driven by pinion 81. By means of these devices the upper table 42 is shifted rapidly from one testing position to another by manipulation of the hand wheel 52.

In Fig. 8 it is seen that the direction of table movement for successive testing movements is usually from left to right, because of the shape of pawl 50 in cooperation with the master ratchet rack 57. However, the pawl may be manually disengaged so that the table is free for retrograde movement at any time as urged by weight 53 and controlled by restraining the rotation of wheel 52. Although the movements of table 42 with respect to table 41 are caused by cooperation between pinion 81 and rack 82, those movements are controlled for accurate location by means of the pawl 50 in cooperation with the master ratchet rack 57 and a shield or mask 51 covering all except certain master teeth in a manner about to be described.

Referring to Figs. 3 and 4, it is noted that the bearing block 84 is formed at the top with a pair of upwardly extending ears 85 and 86 between which is pivoted the pawl 50 on a center 87 passing horizontally through both ears. Extending through the ear 85 and into the space between both ears is a stop pin 88 for determining the normal position of pawl 50. The pawl is formed with an extending arm 89 (Fig. 8) to which is attached the upper end of a spring 90, the lower end of which is caught on a stud 91 extending from the side of the bearing block 84. In Fig. 3 it is seen that the pawl 50 is wide enough to cooperate with teeth cut in the lower edges of both the master control ratchet bar 57 and the superimposed shield bar 51. The difference between such control bars may be noted in Fig. 8 where it is seen that the thick bar 57 is formed with a complete series of teeth 92 corresponding to the spacing of the object gear teeth 95, while the other thin bar or shield 51 is formed with teeth 93 arranged at intervals such as the space of every seventh tooth 92, so that by testing at intervals the operation may be made very rapid. However, it will be appreciated that the master control mask or shield 51 may be made with any arrangement of teeth or be omitted entirely or be arranged without teeth as a mere retainer to place dependence for adjustment solely on the engagement between the pointed end of pawl 50 and the teeth 92 of rack 57. It is also of note that the teeth 92 are formed more accurately than those of the shield 51 which is used merely as a skipping device to eliminate cooperation with intermediate teeth. Teeth 92 of the master rack 57 are proportioned to coincide in spacing and number with the rack teeth 95 on the work piece 44 which is being tested. It will be appreciated that, instead of testing the shape of gear teeth, such as a tooth 95, the master rack may be proportioned to effect control for the intermittent testing of any shape on any portion of a member to be tested.

Turning now to consideration of the manner of assembling the master rack bars 51 and 57 on the front wall of movable table 42, it will be noted that the construction is arranged so that the racks are readily removable for changing from one job to another. Extending forwardly from the front wall of table 42 is a pair of located pins 97, 98 upon which the master racks are hung. The racks are fastened against the wall of the table by a pair of knurled headed screws 99 and 100 threaded into the table 42. The holes in the outer master rack 51 through which screws 99 and 100 pass are large enough to slip over the heads of the screws. However, this outer rack is provided with a pair of swinging clips 101 and 102 pivoted at 103 and 104, respectively, and provided with notched ends with the dimensions of the notch being of a smaller span than the diameter of the heads of the screws 99 and 100 so that, when the latches are slipped over the screws, they pass under the heads of the screws. When the screws are tightened, they press against the clips and hold the master shield in position against the underlying master rack.

The shield 51 may be removed without fully unscrewing screws 99 and 100 because all that is necessary is to unscrew the screws a slight amount, swing back the clips 101 and 102 and slip the shield off the locating pins 97 and 98. Another shield may then be rapidly assembled by the reverse of the process noted.

The object to be tested, such as the rack 44 (Fig. 8) is not assembled directly on table 42 but is mounted on a readily removable angular bracket 43 assembled thereon expressly for carrying such racks. As a universal assembling means, there extends upwardly from the top of table 42 a pair of locating pins, the one pin 107 being circular in shape and the other pin 108 being of a diamond-shaped cross section to control positioning in one direction, while leaving locating in the second horizontal dimension to the first pin 107. Bracket 43 is formed with circular openings coinciding with the locating pins and is merely dropped thereon to be positioned with respect to the master racks 51 and 57. The work piece or object 44 is assembled on the front side of the vertical wall of bracket 43 by means of devices adapted for rapid interchange of such objects 44. It is to be remembered that a large number of such objects as part 44 are to be tested and, after each series of about ten observations, the part 44 is to be replaced by another part to go through the same series of testing operations. For this reason, the part is made readily removable by being held against the side of bracket 43 by a pair of spring clips 110 and 111 which hold the object on a pair of extending pins 112 and 113, the latter of which is diamond-shaped and the former of which is of a tapered formation and arranged as a plunger and has ball-shaped formation 114 extending toward the rear for manipulation and restoration by a leaf spring 115.

The details of construction of a spring clip, such as clip 111, may be noted in Fig. 6 where it is seen that the clip is formed with a manipulative knob 117 and a pressure shoulder 118 as well as a stop shoulder 119. Extending through the center of the clip is a screw stud 120 secured to bracket 43 and formed with a head 121 in a recess within the clip. A coil spring 122 presses between the head 121 and the bottom of the clip to tend to hold it against the object assembled on the bracket. When the clips are rotated about 90°, the object is free to be removed from the pins 112 and 113.

For a complete understanding of the operation of the device, it is believed well to consider a sample series of operations. When it is known which part is to be examined in the comparator, the three controlling members associated therewith are assembled on table 42. They are the main locating rack 57, the shield 51, and an initial setting member 58 such as that shown in Fig. 9. The part 58 is first assembled on the pins 112, 113 (Fig. 8), and it will be noted that this part has at the upper right hand corner an extending sharp corner 125 which is the gaging area for the initial setting. Then the other control member or racks 51 and 57 are assembled on pins 97 and 98, and the table 42 is moved so that pawl 50 is brought into engagement with the first tooth space at the right in the master rack and shield. The two tables 42 and 41 are then ready to be set into the initial position. An initial positioning control chart is placed over the viewing screen 26 (Fig. 2), and the controls of the comparator are operated to lift or lower the entire table assembly and adjust it from side to side until the shape shown on the comparator screen by the projected silhouette of the corner 125 of the initial setting member 58 (Fig. 9) coincides with the gage shape on the comparator screen. When this initial setting has been made, the comparator adjusting controls are locked in position and the tables 29 and 41 (Fig. 1) are held fast while the only movement is that of the table 42 under control of the hand wheel and pawl as already mentioned.

After the initial setting has been made, the setting control bar 58 is removed and then the first of the series of parts to be tested is placed over the pins 112 and 113. Then the chart for comparing related gear tooth shapes is placed on the screen 26 and the device is ready for testing areas on the object. After observing the comparison of the first gear tooth shape with the standard shape, the operator grasps the hand wheel 52 and rocks it in a clockwise direction (Fig. 8) to shift table 42 to the right until the shield 51 is positioned with the shoulder of the second tooth opening 93' slightly to the right of the point of pawl 50. Then, when the hand wheel is released or allowed to move slightly in a counterclockwise direction, as urged by weight 53 and under control of the operator to prevent any jarring action, the pawl 50 abuts against the vertical side of the teeth 92. In this position the projected silhouette of one of the teeth 95 should be within the limits of the standard tooth shape shown on the chart at the comparator screen.

After the second testing operation, the series of testing operations continues with the operator moving the table 42 gradually toward the right step after step under control of the shield and master rack. After the last position is reached, the operator disengages pawl 50 and controls the movement of the table 42 toward the left as urged by weight 53, so that the table does not go against the stop 76 with a jarring action. This may be controlled by pressure on the rim of the hand wheel 52 so that the restoring motion is gradual and controlled until the first tooth position is again opposite the pawl which is dropped in ready for the first examination of the next rack which is then assembled on the pins 112 and 113.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intension therefore to be limited only as indicated by the scope of the following claims.

What is claimed is:

1. In an optical comparator having a light projector, an object holding table and a screen upon which is thrown an enlarged image of an object surface to be compared with a standard chart, the combination of a primary supporting means adjustably supported on said table, a secondary supporting means adjustably supported on said primary means, means for mounting the object to be tested on said secondary means, means including a toothed rack and a locating pawl cooperating therewith for controlling accurately the displacement of said secondary means relative to said primary means, said rack being on said secondary means and having a continuous series of locating teeth, and said pawl being on said primary means and cooperating with said rack, means for moving said secondary means relative to said primary means step by step as determined by said pawl and rack, and a shield for covering all except certain of said teeth on said rack in order to predetermine which dispersed surfaces of the object are to be compared.

2. In an optical comparator having an object supporting table adjustable in all directions, the combination of second and third work supporting tables superimposed upon each other and upon the first mentioned table, said second table being attached to said first table and said third table having ball bearing race ways adapting it for longitudinal movement with respect to said second table, a rack on said third table, manipulative gearing on said second table cooperating with said rack for adjusting said third table relative thereto, retaining means for holding said third table in cooperation with said second table, a stopping means for limiting the movement of the third table with respect to the second table, means for urging said third table into a restored position, a pawl and ratchet mechanism between said second and third tables for governing the relative positions thereof, said ratchet mechanism including a pair of master ratchet bars, one of said bars being formed with a complete series of teeth cooperating with said pawl and the second of said bars being formed as a shield covering all of said teeth except certain of said teeth at predetermined intervals selected for cooperation with the pawl, positioning pins extending from said third table, an object holding bracket assembled on said pins on said third table, and spring operated retaining means and locating means on said bracket for holding the object in position to be optically compared.

3. The combination set forth in claim 2, characterized by the provision of an initial adjustment control member assembled on the bracket temporarily to take the place of the work object and provided with a gage surface for determining the positioning of the tables to the initial position.

4. The combination set forth in claim 2, wherein said master ratchet bar and shield are provided with means making them readily removable including a pair of securing screws with enlarged heads and a pair of clips assembled on said shield to be swung under said heads.

ROGER E. COLES.

REFERENCES CITED

The following references are of record in the file of this patent:

UNITED STATES PATENTS

| Number | Name | Date |
| --- | --- | --- |
| 1,377,068 | Hartness | May 3, 1921 |
| 1,421,042 | Twyman | June 27, 1922 |
| 1,434,131 | Lutz | Oct. 31, 1922 |
| 1,589,349 | Bausch et al. | June 22, 1926 |
| 1,732,730 | Porter et al. | Oct. 22, 1929 |
| 1,974,606 | Fassin | Sept. 25, 1934 |
| 2,035,780 | Beardsley et al. | Mar. 31, 1936 |
| 2,222,165 | Beardsley et al. | Nov. 19, 1940 |
| 2,422,611 | Becker et al. | June 17, 1947 |